(12) United States Patent
Pannell

(10) Patent No.: US 9,288,149 B2
(45) Date of Patent: Mar. 15, 2016

(54) METHOD AND APPARATUS FOR TRANSMITTING PACKETS IN ACCORDANCE WITH IEEE 802.1 QBV

(71) Applicant: Marvell World Trade Ltd., St. Michael (BB)

(72) Inventor: Donald Pannell, Cupertino, CA (US)

(73) Assignee: MARVELL WORLD TRADE LTD., St. Michael (BB)

(*) Notice: Subject to any disclaimer, the term of this patent is extended or adjusted under 35 U.S.C. 154(b) by 91 days.

(21) Appl. No.: 14/022,562

(22) Filed: Sep. 10, 2013

(65) Prior Publication Data
US 2014/0071823 A1    Mar. 13, 2014

Related U.S. Application Data

(60) Provisional application No. 61/699,743, filed on Sep. 11, 2012.

(51) Int. Cl.
| | | |
|---|---|---|
| *H04L 12/815* | (2013.01) | |
| *H04L 12/863* | (2013.01) | |
| *H04L 12/873* | (2013.01) | |
| *H04L 12/805* | (2013.01) | |
| *H04L 12/875* | (2013.01) | |
| *H04L 12/853* | (2013.01) | |
| *H04L 12/865* | (2013.01) | |

(52) U.S. Cl.
CPC ............ *H04L 47/22* (2013.01); *H04L 47/2416* (2013.01); *H04L 47/36* (2013.01); *H04L 47/521* (2013.01); *H04L 47/56* (2013.01); *H04L 47/628* (2013.01); *H04L 47/6215* (2013.01); *H04L 47/6275* (2013.01)

(58) Field of Classification Search
None
See application file for complete search history.

(56) References Cited

U.S. PATENT DOCUMENTS 5,774,700 A * 6/1998 Fisch et al. .................... 713/500
5,822,381 A   10/1998 Parry et al.
(Continued)

FOREIGN PATENT DOCUMENTS

WO    WO 2012/104623 A2    8/2012
WO    WO-2012122382 A1    9/2012
(Continued)

OTHER PUBLICATIONS

Pannell, Don, "AVB—Generation 2 Latency Improvement Options", Mar. 2011, IEEE 802.1.*
(Continued)

*Primary Examiner* — Ayaz Sheikh
*Assistant Examiner* — Peter Chau

(57) ABSTRACT

A network device including a plurality of queues configured to store respective frames of data having a priority level. The network device includes a shaper configured to transmit, during a first portion of a transmission interval, frames of data from a first one of the plurality of queues having a highest priority level, block frames of data from a second one of the plurality of queues during a blocking band extending from a first time prior to a start of the transmission interval to a second time indicating the start of the transmission interval, determine, based on the second time and a maximum frame size to be transmitted during the transmission interval, the first time, and selectively transmit, subsequent to the first time and prior to the second time, frames of data from the second one of the plurality of queues based on the second time.

12 Claims, 7 Drawing Sheets

(56) References Cited

U.S. PATENT DOCUMENTS

| | | | |
|---|---|---|---|
| 6,038,230 | A | 3/2000 | Ofek |
| 6,707,791 | B1* | 3/2004 | Sundqvist .................. 370/230.1 |
| 6,707,821 | B1 | 3/2004 | Shaffer et al. |
| 7,120,113 | B1 | 10/2006 | Zhang et al. |
| 7,426,206 | B1 | 9/2008 | Ofek et al. |
| 7,668,103 | B1 | 2/2010 | Pannell et al. |
| 7,924,711 | B2 | 4/2011 | Rosen |
| 8,171,152 | B2 | 5/2012 | White et al. |
| 8,238,250 | B2 | 8/2012 | Fung |
| 8,379,644 | B1 | 2/2013 | Pannell |
| 8,838,787 | B2 | 9/2014 | Gelter et al. |
| 8,937,974 | B1 | 1/2015 | Pannell |
| 8,982,896 | B2 | 3/2015 | Pannell |
| 2002/0118692 | A1 | 8/2002 | Oberman et al. |
| 2003/0142696 | A1* | 7/2003 | Holmeide et al. ............ 370/508 |
| 2004/0114516 | A1 | 6/2004 | Iwata et al. |
| 2004/0202191 | A1 | 10/2004 | Vrabel |
| 2005/0111362 | A1 | 5/2005 | Freytsis et al. |
| 2006/0239333 | A1* | 10/2006 | Albert et al. .................. 375/130 |
| 2008/0095053 | A1* | 4/2008 | Chen et al. ................. 370/230.1 |
| 2009/0135958 | A1* | 5/2009 | Rueckriem et al. ........... 375/340 |
| 2012/0163521 | A1* | 6/2012 | Kirrmann et al. ............. 375/356 |
| 2012/0230348 | A1 | 9/2012 | Pannell |
| 2013/0215743 | A1 | 8/2013 | Pannell |
| 2014/0071823 | A1 | 3/2014 | Pannell |
| 2014/0341032 | A1* | 11/2014 | Thaler ........................... 370/235 |

FOREIGN PATENT DOCUMENTS

| | | |
|---|---|---|
| WO | WO-2013126630 A1 | 8/2013 |
| WO | WO-2014043092 A1 | 3/2014 |

OTHER PUBLICATIONS

Finn, Norman, "Preemptive Transmission advantages", Jan. 2012, IEEE 802.1.*

Min-Jun Kim et al.: "Frame Forwarding Rules for Link Utilization in IEEE 802.1 AVB Networks", Advanced Language Processing and Web Information Technology, 2008. ALPIT '08. International Conference on, IEEE, Piscataway, NJ, USA, Jul. 23, 2008, pp. 509-512.

PCT International Search Report and Written Opinion of the International Searching Authority dated Dec. 12, 2013 corresponding to PCT/US2013/058954, 13 pages.

Yong-Do Choi et al.: "A Forwarding Method on the IEEE 802.1 AVB", Advanced Language Processing and Web Information Technology, 2008. ALPIT '08. International Conference on, IEEE, Piscataway, NJ, USA, Jul. 23, 2008, pp. 497-502.

PCT International Search Report and Written Opinion of the International Searching Authority dated Jun. 26, 2012 corresponding to PCT/US2012/028290; 13 pages.

Yoram Ofek et al: "The Integrated Metanet Architecture: A Switch-Based Multimedia LAN for Parallel Computing and Real-Time Traffic", Proceedings of the Conference on Computer Communications (INFOCOM), Los Alamitos, IEEE Comp. Soc. Press., US, vol. 2, Jun. 12, 1994, pp. 802-811.

PCT International Search Report and Written Opinion of the International Searching Authority dated Jun. 13, 2013 corresponding to PCT/US2013/027223; 7 pages.

IEEE Std. 802.11-2012; IEEE Standard for Information technology—Telecommunications and information exchange between systems Local and metropolitan area networks—Specific requirements; Part 11: Wireless LAN Medium Access Control (MAC) and Physical Layer (PHY) Specifications; IEEE Computer Society; Sponsored by the LAN/MAN Standards Committee; Mar. 29, 2012; 2793 pages.

IEEE Std 802.11a-1999 (Supplement to IEEE Std 802.11-1999) Supplement to IEEE Standard for Information technology—Telecommunications and information exchange between systems—Local and metropolitan area networks—Specific requirements—Part11: Wireless LAN Medium Access Control (MAC) and Physical Layer (PHY) specifications: High-Speed Physical Layer in the 5 GHZ Band; LAN/MAN Standards Committee of the IEEE Computer Society; Sep. 16, 1999; 91 pages.

IEEE Std. 802.11b; Supplement to IEEE Standard for Information technology—Telecommunications and information exchange between systems—Local and metropolitan area networks—Specific Requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 2009; 96 pages.

IEEE P802.11g/D8.2 Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; Apr. 2003; 69 pages.

Kiran Gunnam et al.; "Multi-Rate Layered Decoder Architecture for Block LDPC Codes of the IEEE 802.11n Wireless Standard"; 2007; pp. 1645-1648.

802.16-2009 IEEE Standard for Local and Metropolitan area networks; Part 16: Air Interface for Broadband Wireless Access Systems; IEEE Computer Society and the IEEE Microwave Theory and Techniques Society; Sponsored by the LAN/MAN Standard Committee; May 29, 2009; 2082 pages.

IEEE Std 802.20/2008; IEEE Standard for Local and metropolitan area networks; Part 20: Air Interface for Mobile Broadband Wireless Access Systems Supporting Vehicular Mobility-Physical and Media Access Control Layer Specification; IEEE Computer Society; Sponsored by the LAN/MAN Standards Committee; Aug. 29, 2008; 1032 pages.

"Specification of the Bluetooth System" Master Table of Contents & Compliance Requirements—Covered Core Package version: 4.0; Jun. 30, 2010; 2302 pages.

IEEE P802.11ac / D2.0; Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 4: Enhancements for Very High Throughput for Operation in Bands below 6 GHz; Prepared by the 802.11 Working Group of the 802 Committee; Jan. 2012; 359 pages.

IEEE P802.11ad / D5.0 (Draft Amendment based on IEEE P802.11REVmb D10.0) (Amendment to IEEE 802.11REVmb D10.0 as amended by IEEE 802.11ae D5.0 and IEEE 802.11aa D6.0); Draft Standard for Information Technology—Telecommunications and Information Exchange Between Systems—Local and Metropolitan Area Networks—Specific Requirements; Part 11: Wireless LAN Medium Access Control (MAC) and Physical Layer (PHY) Specifications—Amendment 3: Enhancements for Very High Throughput in the 60 GHz Band; Sponsor IEEE 802.11 Committee of the IEEE Computer Society; Sep. 2011; 601 pages.

IEEE P802.11ah / D1.0 (Amendment to IEEE Std 802.11REVmc / D1.1, IEEE Std 802.11ac / D5.0 and IEEE Std 802.11af / D3.0) Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation; Prepared by the 802.11 Working Group of the LAN/MAN Standards Committee of the IEEE Computer Society; Oct. 2013; 394 pages.

IEEE Std 802.11h 2003 (Amendment to IEEE Std 802.11, 1999 Edition (Reaff 2003) as amended by IEEE Stds 80211a 1999, 802.11b 1999, 802.11b 1999/Cor 1-2001, 802.11d 2001, and 802.11g 2003); IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 5: Spectrum and Transmit Power Management Extensions in the 5 GHz band in Europe; IEEE Computer Society, Sponsored by the LAN/MAN Standards Committee; Oct. 14, 2003; 75 pages.

IEEE Std 802.1Qav-2009 (Amendment to IEEE Std. 802.1Q-2005) IEEE Standard for Local and metropolitan area networks—Virtual Bridged Local Area Networks, Amendment 12: Forwarding and

(56) References Cited

OTHER PUBLICATIONS

Queuing Enhancements for Time-Sensitive Streams; IEEE Computer Society, Sponsored by the LAN/MAN Standards Committee; Jan. 5, 2010; 87 pages.

Soren Rumpf et al.; "Software Stacks for Mixed-critical Applications: Consolidating IEEE 802.1 AVB and Time-triggered Ethernet in Next-generation Automotive Electronics"; Department of Computer Science Hamburg University of Applied Sciences, Germany; 2014; 5 pages.

802.1AS—Timing and Synchronization; "Standard for Local and Metropolitan Area Networks—Timing and Synchronization for Time-Sensitive Applications in Bridged Local Area Networks"; Editor—Geoff Garner; May 25, 2006; 7 pages.

IEEE 802.1 Qbv Draft 5C's for Time Aware Shaper enhancement to 802.1Q; Version 2, Edited by Don Pannell at Marvell; Jan. 2012; 7 pages.

Ofek, Y., and M. Yung. "The Integrated MetaNet Architecture: A Switch-based Multimedia LAN for Parallel Computing and Real-time Traffic." Proceedings of the 6th IEEE Workshop on Local and Metropolitan Area Networks (Jun. 12, 1994): 10 Pages.

PCT International Search Report and Written Opinion of the International Searching Authority dated Sep. 11, 2015 corresponding to PCT/US2015/034879; 14 pages.

\* cited by examiner

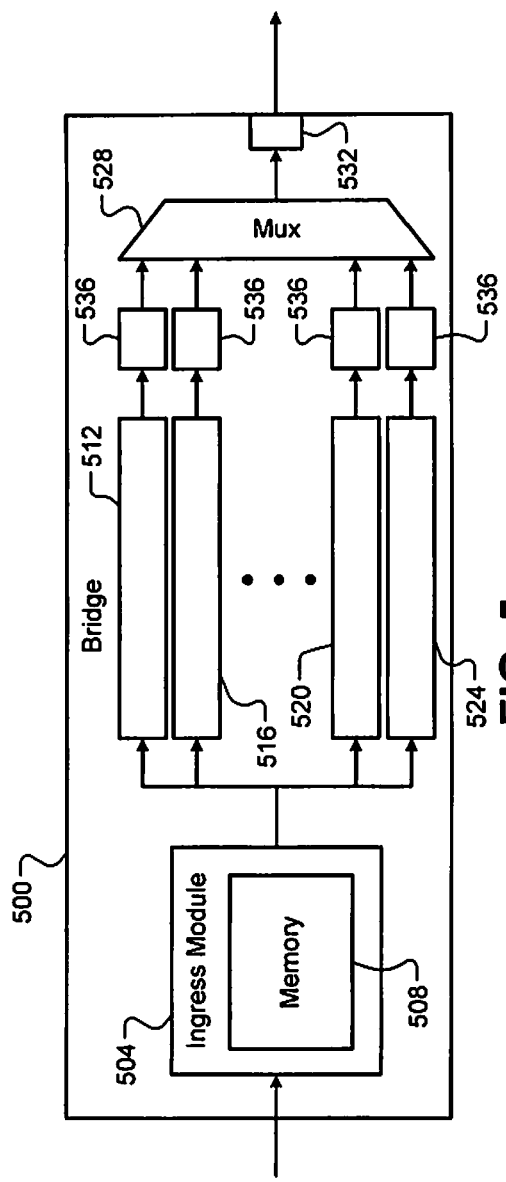
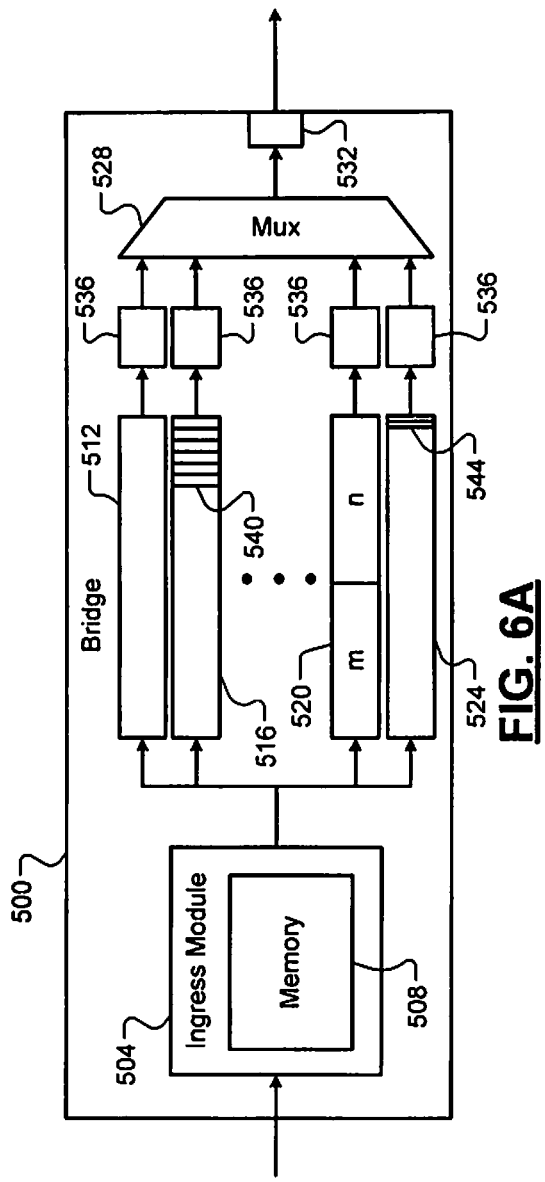

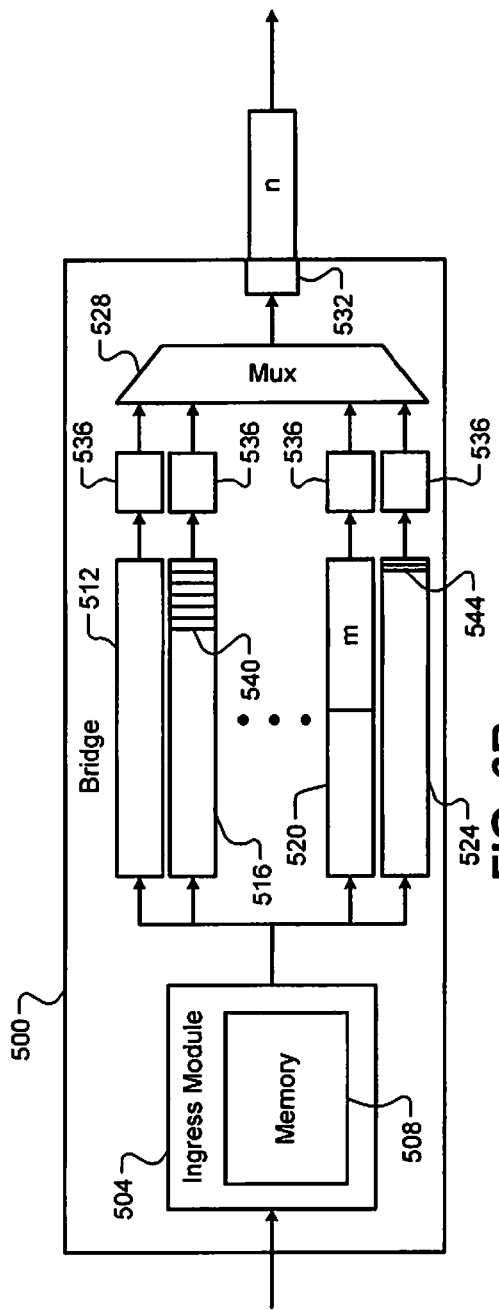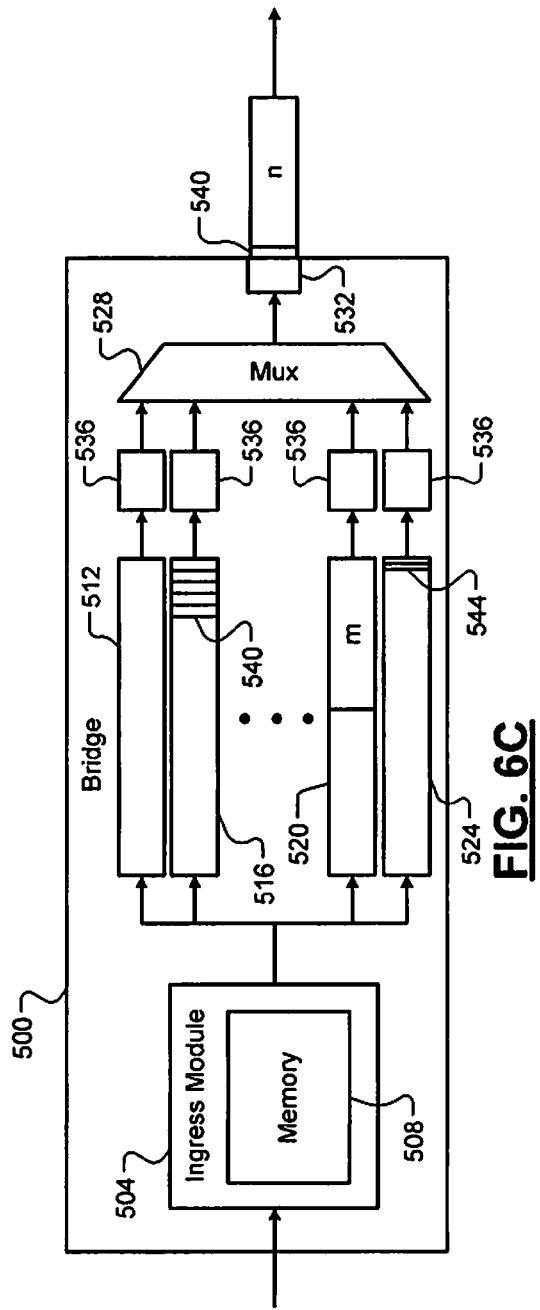

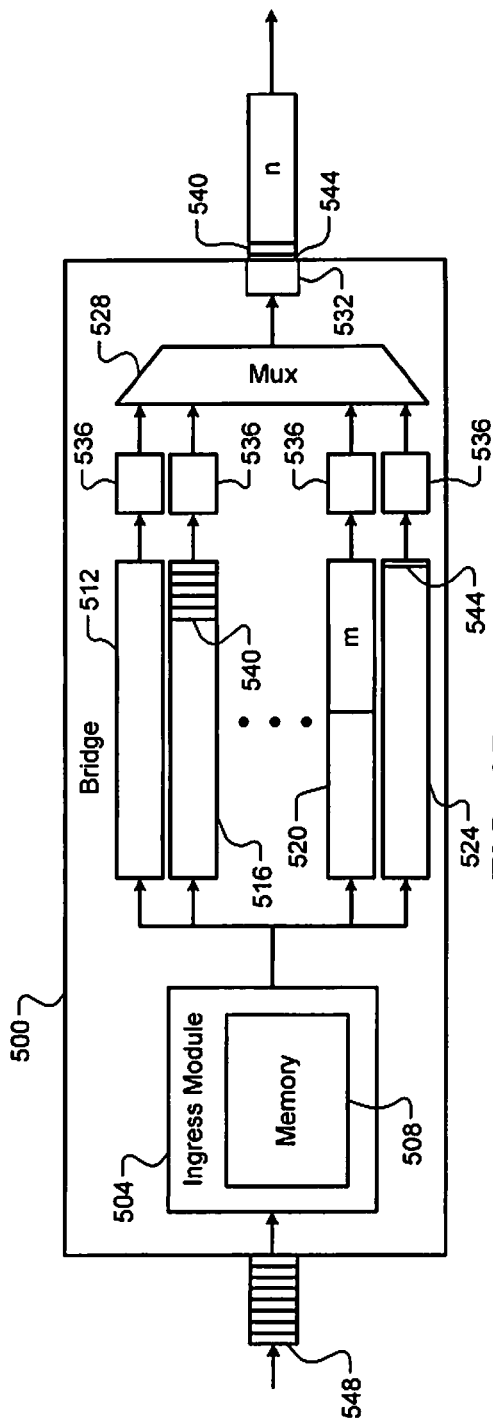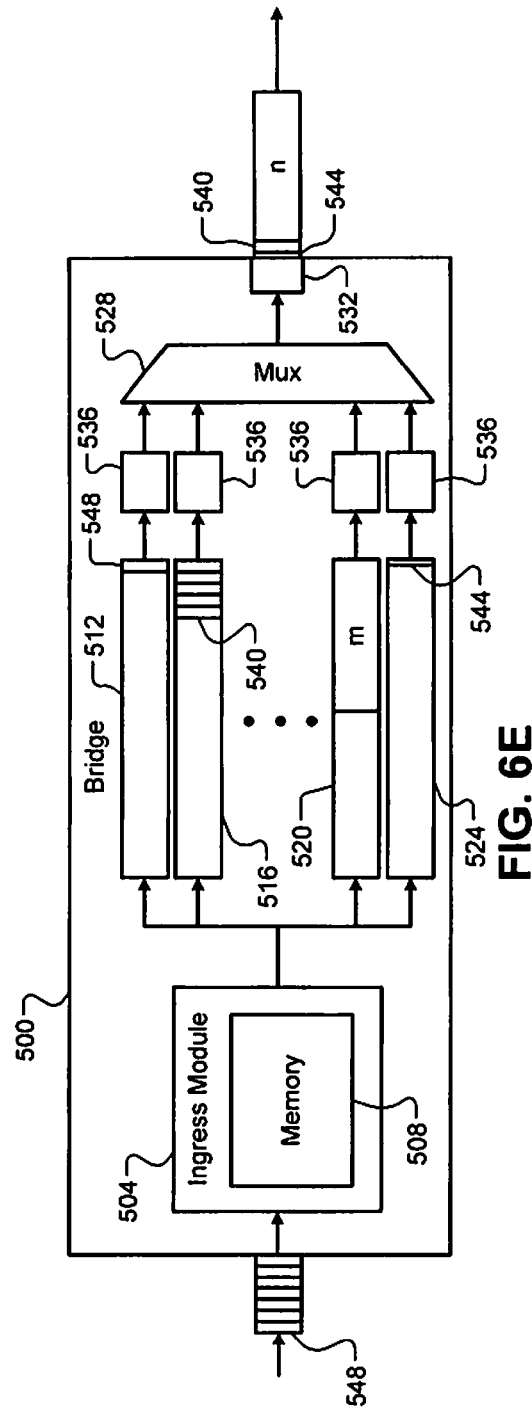

METHOD AND APPARATUS FOR TRANSMITTING PACKETS IN ACCORDANCE WITH IEEE 802.1 QBV

CROSS-REFERENCE TO RELATED APPLICATIONS

This application claims the benefit of U.S. Provisional Application No. 61/699,743, filed on Sep. 11, 2012. This application is related to U.S. patent application Ser. No. 13/772,908, filed on Feb. 21, 2013, and Ser. No. 13/415,112, filed on Mar. 8, 2012. The entire disclosures of the applications referenced above are incorporated herein by reference.

FIELD

The present disclosure relates to bridges in a data communication network.

BACKGROUND

A data communication network may include multiple talkers (or sources of data) and multiple receivers. Any number of bridges (or switches) may be connected between each of the talkers and the receivers. The data communication network may be an arbitrary network (referred to as a non-engineered network) or non-arbitrary network (referred to as an engineered network). An arbitrary network may be, for example, a residential local area network (LAN), which may have different network devices (e.g., computers, cellular phones, televisions, printers, and electronic tablets) arbitrarily connecting and disconnecting at various points in the network and at random times. The network devices may connect and disconnect at any time regardless of the priority levels of data being transmitted in the arbitrary network.

A non-arbitrary network may be, for example, an automotive network within a vehicle or a manufacturing assembly line network. In general, network devices in a non-arbitrary network are fixed and are not being connected and/or disconnected from the non-arbitrary network. Although network devices may be connected to and/or disconnected from a non-arbitrary network, communication with a network device that is being connected to or disconnected from the non-arbitrary network is given lower priority during transmission periods of high-priority data. During these transmission periods, high-priority data is transmitted between network devices in the non-arbitrary network.

For example, a non-arbitrary Ethernet network that is operating according to Institute of Electrical and Electronics Engineers (IEEE) 802.1 Qav and/or Qbv may include a talker (or source), multiple bridges and a listener (or receiver). The talker may transmit high-priority data to the listener over the bridges during allocated transmission periods of periodic transmission time intervals. High-priority data may refer to, for example, Class A or Class B data with low-latency requirements. The term latency refers to time for a high-priority frame to be transmitted through one or more hops of the non-arbitrary network. The latency of a single hop is measured from a time when a last bit of a high-priority frame is received by a network device for that hop to a time when the last bit is transmitted from the network device. Simply stated, the latency of a single hop is measured from the last bit into the network device to the last bit out of the network device. A single hop may refer to a talker (referred to as an end station) or a bridge of the non-arbitrary network.

In a non-arbitrary Ethernet network, transmitted data may have, for example, one of three to eight priority levels. Class A data may include audio video bridging (AVB) data with a highest priority level. The highest priority is used to insure the lowest latency. Although AVB data may include audio data and/or video data, AVB data may also include control data, user data, reference data, or other types of data. The highest priority level data may be provided with a predetermined amount of bandwidth and a predetermined maximum latency. This assures that the Class A data is transmitted during allocated time periods and latency associated with transmitting the Class A data over a predetermined number of hop(s) and/or between end stations is less than the predetermined maximum latency. Class B data may be AVB data with a next highest priority level. All Non-AVB data use the remaining lower priority levels. In general, higher priority data is transmitted before lower priority data. If a device supports less than the maximum eight priority levels the IEEE 802.1 Qav standard defines how the eight external priorities are to be mapped to the number of priorities supported by the device. In all cases Class A is the highest.

IEEE AVB standards define a set of standards that when used together support guaranteed bandwidth and latency for reserved AVB streams over various networking media, such as networking media satisfying IEEE 802.3 Ethernet standards. The IEEE 802.1 Qav standard requires that a bridge reshape (i.e., spread out) an AVB stream passing through the bridge. This is done on a per-class basis in a bridge. Since AVB supports two classes of data, namely Class A and Class B, two Qav shapers are needed per egress port in a bridge.

FIG. 1 shows an example of a conventional bridge 100 configured for use according to the IEEE 802.1 Qav standard. Although the bridge 100 is shown having a certain number of ingress ports and egress ports, the bridge 100 may have additional ingress and/or egress ports. The bridge 100 includes ingress ports Pu-Py, an ingress module 104, and an egress module 108. The ingress module 104 receives data from the ports Pu-Py and can store the data in a memory 112. The egress module 108 can include, for example, a Class A queue 116, a Class B queue 120 and non-AVB queues 124 per egress port. The queues 116, 120, 124 receive data from the ingress module 104 and store data of the respective Classes A, B, non-AVB.

The egress module 108 further includes Class shapers (identified as Class shapers $f_a$), a selector module 128, a multiplexer 132 and an output port 136. The Class shapers $f_Q$ are provided for AVB data including Class A data and Class B data. The Class shapers $f_Q$ shape (or spread out) respectively the Class A data and the Class B data received from a corresponding one of the Class A queue and Class B queue. As a result, the data is shaped on a per-class basis. The Class A data and the Class B data are independently spread out over time at respective rates of the Class shapers $f_Q$. The selector module 128 signals the multiplexer 132 to select data from one of the Class shapers $f_Q$ or the non-AVB queues 124 to provide to the output port 136.

SUMMARY

A network device includes a plurality of queues, each of the plurality of queues configured to store respective frames of data having a priority level associated with a corresponding one of the plurality of queues. The network device includes a shaper configured to transmit, during a first portion of a transmission interval, frames of data from a first one of the plurality of queues having a highest priority level, block frames of data from a second one of the plurality of queues during a blocking band extending from a first time prior to a start of the transmission interval to a second time indicating the start of the transmission interval, determine, based on the second time and a maximum frame size to be transmitted during the transmission interval, the first time, and selectively transmit, subsequent to the first time and prior to the second time, frames of data from the second one of the plurality of queues based on the second time.

A method of operating a network device includes storing, in a plurality of queues, respective frames of data having a priority level associated with a corresponding one of the plurality of queues, transmitting, during a first portion of a transmission interval, frames of data from a first one of the plurality of queues having a highest priority level, blocking frames of data from a second one of the plurality of queues during a blocking band extending from a first time prior to a start of the transmission interval to a second time indicating the start of the transmission interval, determining, based on the second time and a maximum frame size to be transmitted during the transmission interval, the first time and selectively transmitting, subsequent to the first time and prior to the second time, frames of data from the second one of the plurality of queues based on the second time.

A method of operating a network device includes storing, in a plurality of queues, respective frames of data having a priority level associated with a corresponding one of the plurality of queues, transmitting, during a first portion of a transmission interval, frames of data from a first one of the plurality of queues having a highest priority level, blocking frames of data from a second one of the plurality of queues during a blocking band extending from a first time prior to a start of the transmission interval to a second time indicating the start of the transmission interval, determining, based on the second time and a maximum frame size to be transmitted during the transmission interval, the second time, and selectively transmitting, subsequent to the first time and prior to the second time, frames of data from the second one of the plurality queues based on the second time.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

FIG. 5 is a functional block diagram of a bridge of the non-arbitrary network of FIG. 4.

FIGS. 6A-6E illustrate frame size-based data progressions through the bridge in accordance with an embodiment of the present disclosure.

In the drawings, reference numbers may be reused to identify similar and/or identical elements.

DESCRIPTION

Like IEEE 802.1 Qav, IEEE 802.1 Qbv effectively requires that talkers (network source nodes of data streams) perform per-flow shaping (or pacing) followed by per-class shaping by timing the release of each Qbv frame. A talker may receive data from one or more sources, such as a microphone, a storage device, a digital versatile disc (DVD) player, etc. The talker can perform shaping for each source to insure that each flow of data received from a source is appropriately spaced out, since the flows of data from the sources can (i) end up being received at different listeners (network receive nodes of data streams), and (ii) follow different paths through a network prior to being received at the listeners. Example flow shaping (for example only, according to the IEEE 802.1 Qav standard) is described in U.S. patent application Ser. No. 13/772,908, filed on Feb. 21, 2013.

A transmission interval (i.e., cycle) according to the IEEE Qbv standard begins at a time $t_0$ and includes a blocking or "guard" band that begins prior to the time $t_0$. In some implementations, the blocking band corresponds to a maximum frame size. For example only, the maximum frame size is 1522 bytes or 123.360 μsec for Fast Ethernet (FE). During the blocking band of a transmission interval, transmission of frames of data below a certain priority (e.g., non-Class A frames) is blocked to prevent interference with higher priority frames (e.g., Class A frames) transmitted during the beginning of the transmission interval, which overlaps the blocking band. An example implementation of a blocking band is described in U.S. patent application Ser. No. 13/415,112, filed on Mar. 8, 2012.

Figure 2:
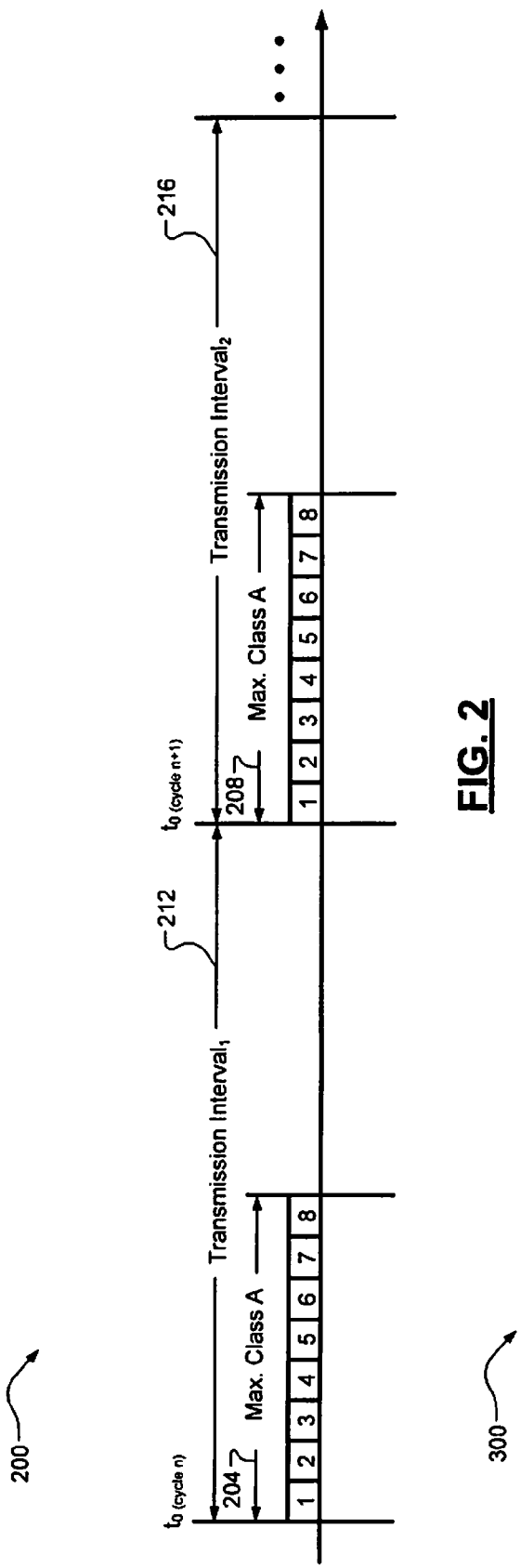
FIG. 2 is a timing diagram illustrating Class A allocated time periods and corresponding periodic transmission time intervals.

FIG. 2 shows an example timing diagram 200 for a device that does not implement blocking bands. The timing diagram 200 illustrates Class A allocated time periods or windows and corresponding periodic transmission time intervals. Class A data may be transmitted from a talker within allocated time windows of periodic transmission time intervals. Each allocated time window has a start time $t_0$. In FIG. 2, two example allocated time windows 204, 208 and corresponding periodic transmission time intervals 212, 216 are shown. Each of the periodic transmission time intervals may be referred to as a cycle. The cycles for the two periodic transmission time intervals 212, 216 are labeled n and n+1.

For example only, requirements for Fast Ethernet may include transmission of eight 128 byte frames every 500 μs (periodic transmission time interval). The allocated time window for Class A data (may be referred to as low latency data) within each of the periodic transmission time intervals may be 108.8 μs. For eight frames, this may include: time associated with the 128 bytes of data and 22 bytes of overhead data; and/or 20 bytes of time associated with preamble data and an interframe gap (IFG). A 108.8 μs burst window provides 391.2 μs subsequent to the allocated time windows 204, 208 within each interval 212, 216 for other data (may be referred to as non-low latency data or non-Class A data).

As another example, requirements for Gigabyte Ethernet (GE) may include transmission of thirty-two 256 byte frames every 500 μs. The allocated time window for Class A data within each of the periodic transmission time intervals may be 76.288 μs. For thirty-two frames, this may include: time associated with the 256 bytes of data and 22 bytes of overhead data; and/or 20 bytes of time associated with preamble data and an IFG. A 76.288 μs burst window provides 423.712 μs for other data (e.g., non-low latency data).

To satisfy AVB generation 2 requirements, the Class A data is to be transmitted over 5 hops with less than or equal to 100 μs of delay for both Fast Ethernet and Gigabyte Ethernet. Although Fast Ethernet and Gigabyte Ethernet are disclosed herein, the implementations disclosed herein may apply to other transmission speeds. Also, although the implementations are primarily described with respect to Ethernet networks, the implementations may be applied to other networks.

Figure 3:
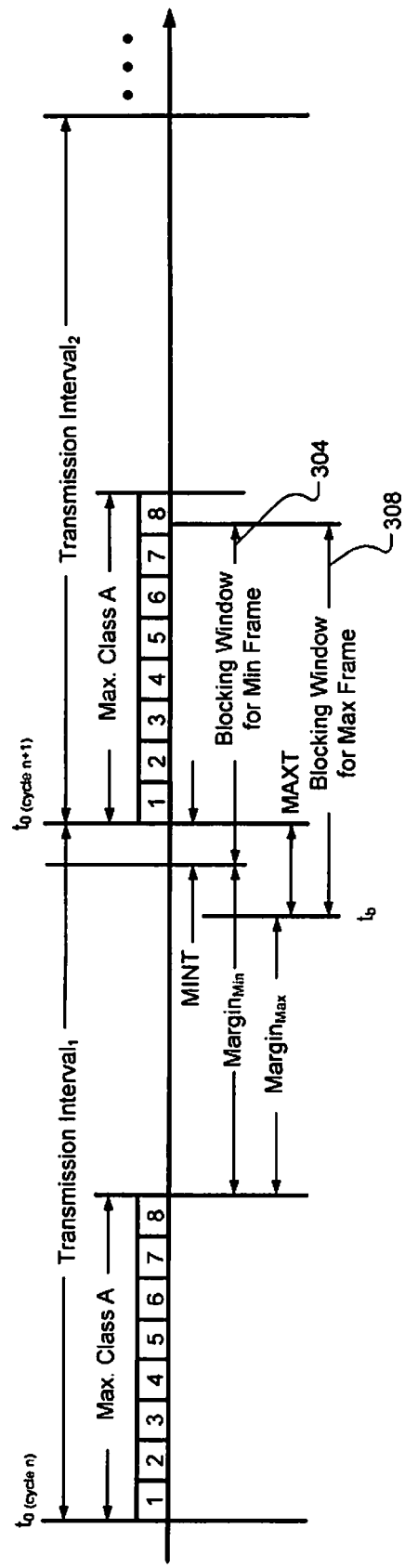
FIG. 3 is a timing diagram illustrating blocking bands relative to Class A allocated time periods.

FIG. 3 shows an example timing diagram 300 for a device that implements blocking bands. The timing diagram 300 is shown illustrating blocking windows relative to Class A allocated time periods. In order to prevent interference with Class A data, blocking windows may be used to prevent transmission of frames having a determined size. The size may be predetermined or determined based on information provided to the device.

As shown in FIG. 3, two blocking bands 304, 308 relative to transmission time of the eight blocks of data 1-8 are shown. The first blocking band 304 is associated with a minimum size interference frame (e.g., 256 bytes). The second blocking band 308 is associated with a maximum interference size frame (e.g., 1500 bytes). The first blocking band 304 includes time MINT (e.g., 23.84 μs) to transmit the minimum size frame and a time to transmit at least seven of the Class A frames and a portion of an eighth Class A frame. The second blocking band 308 includes time MAXT (e.g., 123.36 μs) to transmit the maximum size frame and a time to transmit at least seven of the Class A frames (or the number of Class A frames minus one) and a portion of the eighth (or last) Class A frame. The blocking bands 304, 308 may not extend to an end of the Class A burst period to minimize a delay from when non-Class A data is permitted to pass (no longer blocked) and a time when the non-Class A data is actually forwarded from a respective queue within the device.

Each blocking band provides a corresponding margin period (e.g., $Margin_{Min}$, $Margin_{Max}$). Non-Class A frames that are less than or equal to the minimum size frame may be transmitted during the margin period $Margin_{Min}$ (e.g., 367.36 μs). Non-Class A frames that are less than or equal to the maximum size frame may be transmitted during the margin period $Margin_{Max}$ (e.g., 267.84 μs). These margins provide boundaries upon which transmission determinations of other traffic or non-Class A frames including frames of a maximum size (e.g., 1522 bytes) may be based.

In this manner, non-Class A frames that do not begin transmission prior to the start of the blocking band are prevented from being transmitted during the blocking band to ensure that any Class A frames can be transmitted at $t_0$. For example purposes only, if the blocking band 308 is implemented to account for a maximum size interference frame, the blocking band 308 may begin at a time $t_b$. Accordingly, if transmission of any (non-Class A) maximum size interference frames has not begun by the time $t_b$, then no data is transmitted from $t_b$ to $t_0$, and transmission of Class A frames can begin without interference at $t_0$.

A device according to the principles of the present disclosure (e.g., an 802.1 Qbv device) includes a bridge implementing time aware shaping. The device is provided with a time corresponding to a start of the blocking band (e.g., $t_0$-123.360 μsec, or $t_b$). After the start of the blocking band, the bridge selectively permits transmission of non-Class A frames during a remainder of the blocking band provided that transmission of the non-Class A frames can be completed prior to $t_0$.

Figure 4:
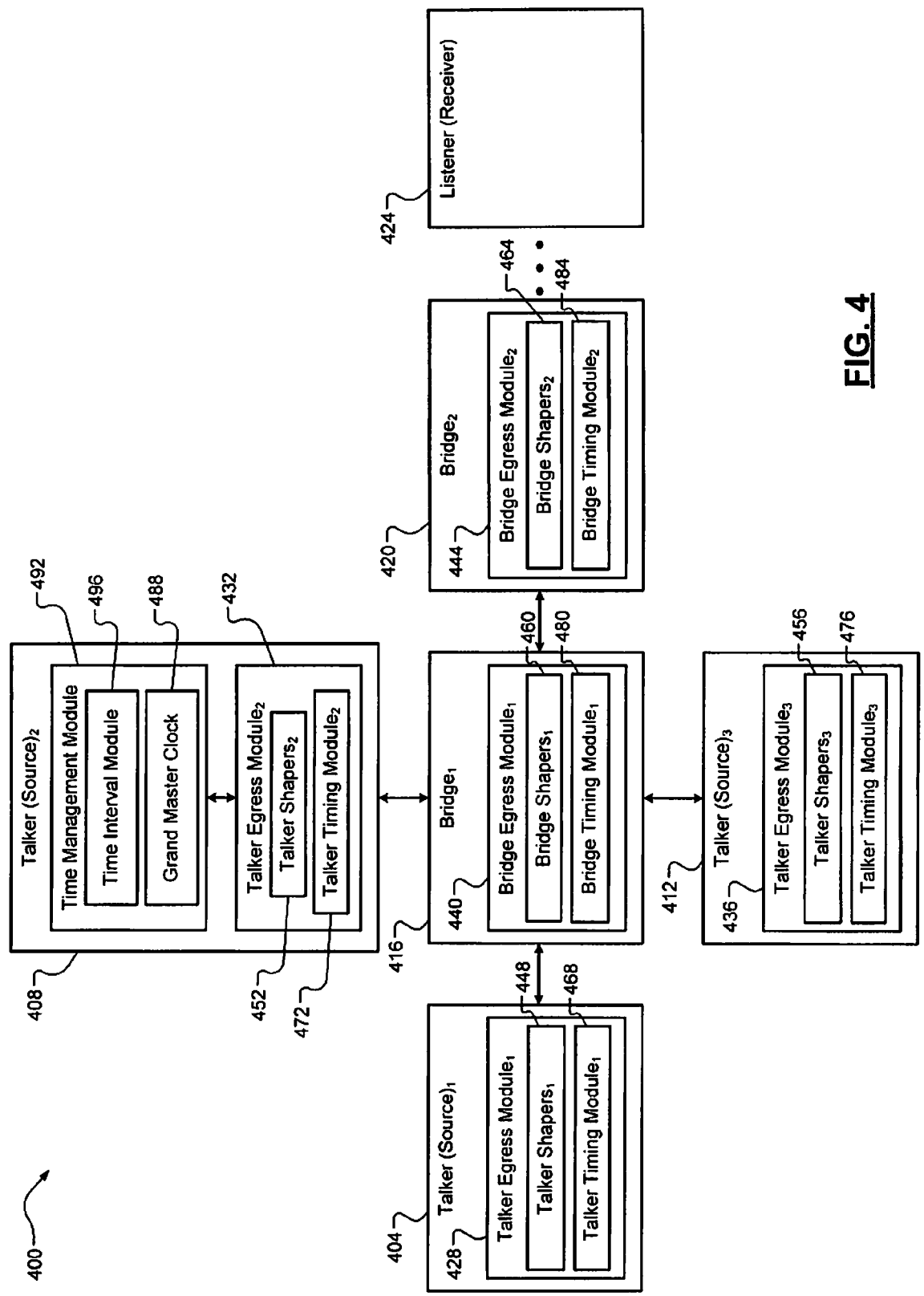
FIG. 4 is a functional block diagram of a non-arbitrary network incorporating bridges in accordance with an embodiment of the present disclosure.

In FIG. 4, a non-arbitrary network 400 is shown. The non-arbitrary network 400 includes one or more talkers (three talkers 404, 408, and 412 are shown), one or more bridges (two bridges 416, 420 are shown) and a listener 424. The talkers 404, 408, 412 may be referred to as a source, as the talkers transmit data to the listener 424. The listener 424 may be referred to as a receiver, as the listener 424 receives data from the talkers 404, 408, 412. The talkers 404, 408, 412 and bridges 416, 420 may each include respective egress modules 428, 432, 436, 440, 444. The bridges 416, 420 may satisfy IEEE 802.1 AS, which provides precise timing protocols (PTPs). The bridges 416, 420 provide a daisy chain of network devices between end stations (e.g., the talkers 404, 408, 412 and the listener 424). Each of the egress modules 428, 432, 436, 440, 444 may include respective shapers 448, 452, 456, 460, 464 and/or timing modules 468, 472, 476, 480, 484.

The shapers 448, 452, 456, 460, 464 may include blocking shapers and/or deblocking shapers. The blocking shapers may include time-unaware blocking shapers and time aware blocking shapers (TABSs). The time aware blocking shapers operate based on a global clock signal generated by a grand master clock 488. The grand master clock 488 may be located in any of the network devices of the network 400. The global clock signal may be shared with any of the network devices in the network 400. As an example, the grand master clock 488 is shown in the second talker 408, but may be located in one of the other talkers 404, 412, one of the bridges 416, 420, the listener 424, or other network device connected to the network 400.

The time aware blocking shapers may delay a transmission start of non-highest priority data (e.g., non-Class A data or Class B data and/or non-AVB data). This delay may be performed based on transmission timing of the highest priority data (e.g., Class A data). Transmission timing of the Class A and non-Class A data may be provided by the timing modules 468, 472, 476, 480, 484, which generate priority timing signals. Each priority timing signal may indicate a window in which corresponding data is permitted or not permitted to be transmitted. The priority timing signals generated for non-Class A data (or Class B data and/or unprotected data) may be generated based on an allocated time period in each periodic transmission time interval. The highest priority data (Class A data) is transmitted in each of the allocated time periods. This insures that an output of an egress module is idle such that Class A bursts are not interfered with by transmission of other data (non-highest priority data).

The network device that includes the grand master clock 488 or one of the other network devices in the network 400 may include a time management module 492. The network device having the grand master clock 488 and/or the time management module 492 may be referred to as a master device. Devices not having the grand master clock 488 and/or the time management module 492 may be referred to as slave devices. The time management module 492 may include the grand master clock 488 and/or a time interval module 496. The time interval module 496 may set the periodic transmission time interval (i.e. duration of the periodic transmission time interval) and a start time $t_0$ of each of the periodic transmission time intervals. The global clock signal, the periodic transmission time interval and the start time $t_0$ of the periodic transmission time intervals may be shared between the network devices using a management information base (MIB) modules and/or a simple management network protocols (SMNPs). The time interval module 496 may also set, and share, a blocking band duration and/or a start time $t_0$ of the blocking band.

The talkers 404, 408, 412, bridges 416, 420, and/or listener 424 may communicate with each other via wired or wireless connections and/or mediums. The wireless connections and/or mediums may satisfy, for example, IEEE standards 802.11, 802.11a, 802.11b, 802.11g, 802.11h, 802.11n, 802.16, and 802.20.

In FIG. 5, an example device (e.g., a bridge) 500 is shown. The bridge 500 may be one of the bridges 416, 420 of FIG. 4. The bridge 500 includes an ingress module 504 with memory 508, a Class A queue 512, a Class B queue 516, a first non- AVB queue 520, a second non-AVB queue 524, a multiplexer 528, and an output port 532. The first non-AVB queue 520 may store management data and the second non-AVB queue 524 may store legacy data. The bridge 500 may include frame size-based blocking shapers 536, which include time aware shapers, between respective ones of the queues 512-524 and the multiplexer 528.

In FIGS. 6A-6E, frame size-based data progressions through the bridge 500 are shown. In FIG. 6A, a state of the bridge 500 is shown at time $t_0$ minus, for example, 16 μs or 16 μs prior to a Class A burst period. The time $t_0$ refers to a start time of the Class A burst period. Class B frames 540 are stored in the Class B queue 516. Management frames n, m are stored in the first non-AVB queue 520. Legacy frames 544 are stored in the second non-AVB queue 524. The Class B frames 540 may be gated (or shaped) and prevented from being transmitted at time $t_0$ minus 16 μs. As a result, the management frame n may begin to be transmitted from the bridge 500.

In FIG. 6B, a state of the bridge 500 is shown at time $t_0$ minus, for example, 3.664 μs. At this time, transmission of the management frame n from the bridge 500 is completed. The 3.664 μs is equal to the 16 μs minus 12.336 μs for the management frame n to be transmitted. At this time, the Class B frames may be ready to transmit and have credits to transmit two frames. A time to transmit a frame of 300 bytes of Class B data is 2.56 μs (includes 20 bytes of preamble and/or IFG time). Since there is 3.664 μs remaining before time $t_0$, one frame is permitted to be transmitted. The other Class B frame that is ready to be transmitted is blocked.

In FIG. 6C, a state of the bridge 500 is shown at time $t_0$ minus, for example, 1.104 μs. Since there is 1.104 μs before time $t_0$, the Class B frames 540 and the second non-AVB frame m are blocked. The Legacy frames 544 may be, for example, 64 bytes in length. A time to transmit one of the Legacy frames 544 including 20 bytes of preamble and IFG time is 0.672 μs, which is less than the 1.104 μs. For this reason, one of the Legacy frames 544 is permitted to pass to the multiplexer 528.

Figure 1:
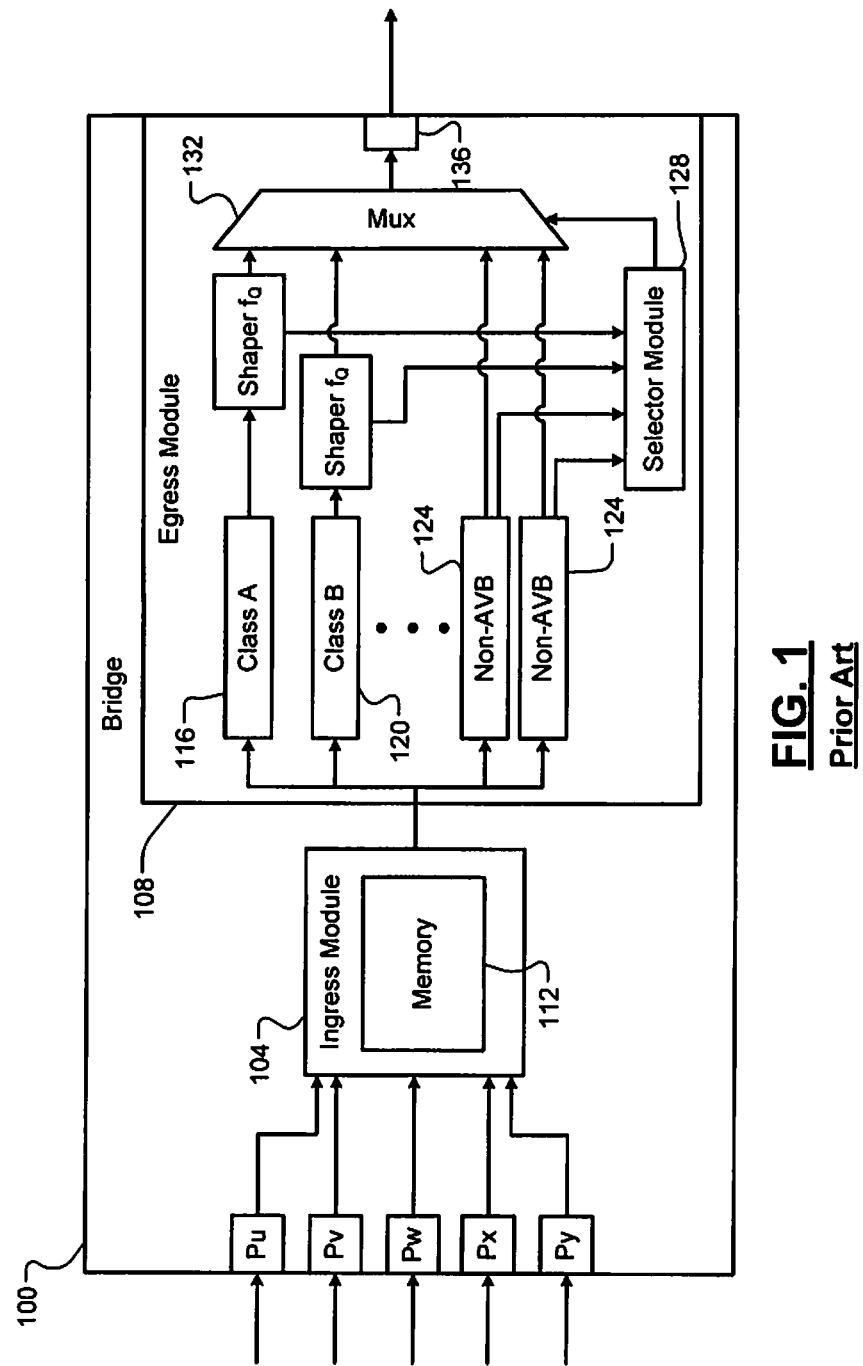
FIG. 1 is a functional block diagram of a conventional bridge.

In FIG. 6D, a state of the bridge 500 at time $t_0$ minus, for example, 0.432 us is shown. As time remaining to $t_0$ is less than 0.672 μs, the remaining frames are blocked. This allows the output port 532 to be idle at $t_0$. Class A frames 548 may arrive at an input of the bridge 500. In FIG. 6E, The Class A frames 548 are permitted to be stored in the Class A queue 512 and be transmitted from the bridge 500 without interference from the frames stored in the other queues 516, 520, 524. The time aware blocking shapers may release (i.e. no longer block) the Class B queue 516 and the non-AVB queues 520, 524 subsequent to a predetermined period after time $t_0$. The queues 516, 520, 524 may be released, since a selector module (e.g., as shown in FIG. 1) prevents selection of these queues when data is in the Class A queue 512 and is being transmitted out the output port 532. For this reason, the burst of the Class A frames continues until no more Class A frames are stored in the Class A queue 512. Frames in queues 516, 520, 524 may be transmitted when the Class A queue 512 is emptied.

By using time aware blocking shapers for each of the non-Class A queues 516, 520, 524, such that the output port 532 is idle at time $t_0$ (start of Class A burst) and by accounting for head-of-line sizes of frames in the non-Class A queues 516, 520, and 524, efficient use of time is provided. Non-Class A frames that can be transmitted prior to time $t_0$ are transmitted based on priority.

For example, in addition to the periodic transmission time interval, the start time $t_0$ of each of the periodic transmission intervals, and/or a global clock signal, the bridge 500 may be provided with data indicative of a start time $t_b$ of the blocking band. For example, the data indicative of the start time $t_b$ of the blocking band may include the maximum frame size (e.g., 1522 bytes) or the actual start time $t_b$ of the blocking band. For example only, another device in the network 400 as shown in FIG. 4 may provide the periodic transmission time interval, the start time $t_0$ of each of the periodic transmission intervals, the global clock signal, and the maximum frame size. Each of the time aware shapers 536 may be programmed with the maximum frame size and therefore be aware of the start time $t_b$ of the blocking band since $t_b$ corresponds to $t_0$—the time to transmit the maximum frame size. Accordingly, at the time $t_b$, each of the time aware shapers 536 is aware of a remaining time before $t_0$ and may selectively allow frames from the non-Class A queues 516, 520, and 524 that can be transmitted in the remaining time.

Figure 7:
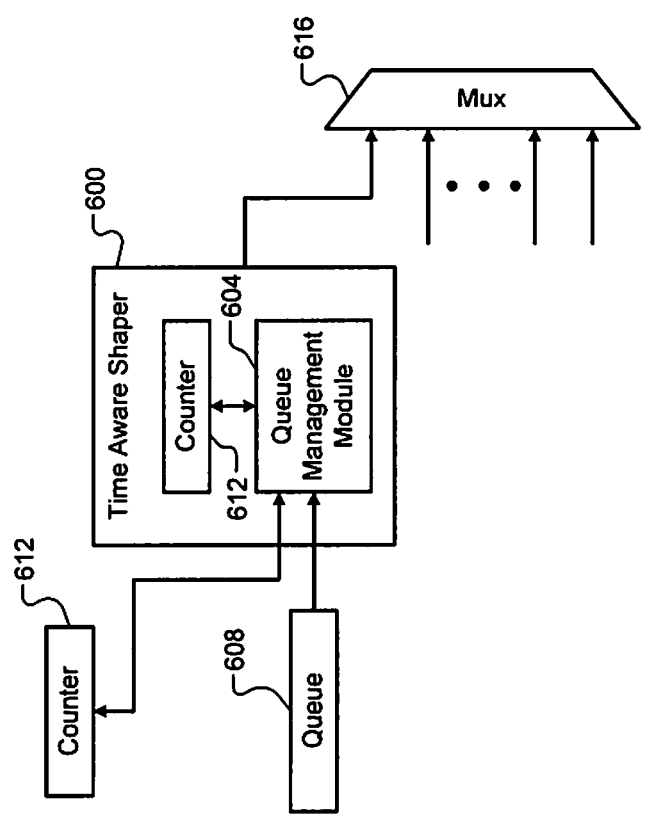
FIG. 7 is a functional block diagram of a time aware shaper in accordance with an embodiment of the present disclosure.

FIG. 7 shows an example time aware shaper 600. The shaper 600 includes a queue management module 604 that communicates with a corresponding queue 608. For example, the queue 608 corresponds to one of the non-Class A queues 516, 520, and 524. The queue management module 604 is provided with (e.g., may store or may be programmed with) data indicative of a start time $t_b$ of the blocking band, such as a maximum frame size. The queue management module 604 is also provided with the start time $t_0$ of a transmission interval. Accordingly, the queue management module 604 is configured to determine the start time $t_b$ of the blocking band based on $t_0$ and the maximum frame size.

Each shaper 600 may include a counter 612 that communicates with the queue management module 604. Additionally or alternatively, the bridge 500 as shown in FIGS. 6A-6E may include the counter 612, which communicates with multiple shapers 600. At the time tb, the counter 612 is initialized with a value corresponding to the remaining time before t0. The queue management module 604 initializes the counter 612 at $t_b$. For example, the initial value of the counter 612 may correspond to an amount of data that can be transmitted in the remaining time (e.g., 1522 bytes), or an amount of time or clock cycles. For example only, the time may correspond to a difference between respective absolute or time of day times at $t_b$ and $t_0$. In various implementations, the value of the counter 612 may correspond to a byte count (i.e., a number of bytes able to be transmitted in the remaining time before $t_0$), a number of clock cycles (i.e., a number of clock cycles of a local or global clock until $t_0$), and/or a difference between a current absolute time and an absolute time at $t_0$.

As the remaining time before $t_0$ decreases (i.e., as a time gets closer to $t_0$), the counter 612 decreases. In other words, as a time approaches the time $t_0$, less remaining time is available for transmission of a non-Class A frame. Accordingly, each queue management module 604 monitors head-of-line sizes of frames in the corresponding queue 608 to determine whether the head-of-line frame can be transmitted in the remaining time before t0. For example only, the value of the counter 612 may decrease according to a global clock signal or a local clock signal. If the value of the counter 612 is an amount of data (e.g., a byte count), then the byte count may decrement by 1 byte for each time period corresponding to a time needed to transmit 1 byte.

If an available head-of-line frame (plus any additional processing overhead) is smaller than an amount of data corresponding to the remaining time (e.g., the byte count indicated by the counter 612), then the queue management module 604 allows the frame to pass to multiplexer 616. For example, the queue management module 604 may compare the value of the counter 612 to the head-of-line frame size and allow the frame if the head-of-line frame size is less than the value of the counter 612. After the frame is transmitted, each shaper 500 repeats the comparison with a next head-of-line frame and the remaining time indicated by the value of the counter 612 until no remaining frame sizes are less than the remaining time. In some implementations, the shaper 600 may allow frames other than head-of-line frames if the frames have a size smaller than the remaining time. In other words, the shaper 600 may allow frames to be passed to the multiplexer 616 out of order.

In this manner, the queue management module 604 is configured to determine, using the time $t_0$ and the maximum frame size or other data indicative of a size of the blocking band, a start time $t_b$ of the blocking band and a remaining time/clock cycles/byte count between the start time $t_b$ and the time $t_0$. The queue management module 604 initializes the counter 612 with a value corresponding to the remaining time/clock cycles/byte count and selectively allows a frame to be transmitted during the blocking band if the size of the frame is less than a frame size indicated by the value of the counter 612.

Figure 8:
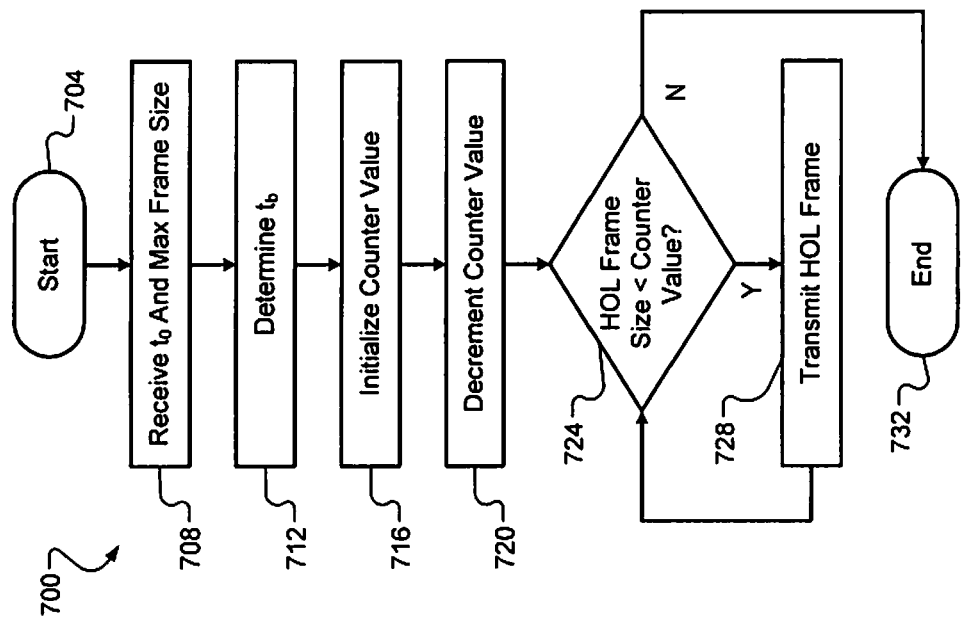
FIG. 8 illustrates a small frame handling method in accordance with an embodiment of the present disclosure.

FIG. 8 shows a small frame handling method 700. The small frame handling method starts at 704. For example, a small frame may correspond to any frame that is smaller than a maximum frame size, although other thresholds for defining a small frame may be used (e.g., less than a predetermined percentage of the maximum frame size). At 708, the method 700 receives a time $t_0$ indicating a start of a transmission interval and the maximum frame size. At 712, the method 700 determines a start time $t_b$ of a blocking band based on the time $t_0$ and the maximum frame size. At 716, the method 700 initializes a value of a counter at the start time $t_b$. For example, in some implementations, the value of the counter can correspond to a byte count, a number of clock cycles, or a time. At 720, the method 700 begins to decrement the value of the counter. At 724, the method 700 determines whether a head-of-line frame size is less than the value of the counter. If the value of the counter does not correspond to a byte count (e.g., the value of the counter corresponds to a time or a number of clock cycles), then the method 700 may first convert the head-of-line frame size to a time or number of clock cycles needed to transmit the head-of-line frame. If true, the method 700 continues to 728. If false, the method 700 continues to 732. At 728, the method 700 transmits the head-of-line frame. The method 700 ends at 732.

The wireless communications described in the present disclosure can be conducted in full or partial compliance with IEEE standard 802.11-2012, IEEE standard 802.16-2009, IEEE standard 802.20-2008, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2012 may be supplemented by draft IEEE standard 802.11ac, draft IEEE standard 802.11ad, and/or draft IEEE standard 802.11ah.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

Further aspects of the present disclosure relate to one or more of the following clauses.

A network device includes a plurality of queues, each of the plurality of queues configured to store respective frames of data having a priority level associated with a corresponding one of the plurality of queues. The network device includes a shaper configured to transmit, during a first portion of a transmission interval, frames of data from a first one of the plurality of queues having a highest priority level, block frames of data from a second one of the plurality of queues during a blocking band extending from a first time prior to a start of the transmission interval to a second time indicating the start of the transmission interval, determine, based on the second time and a maximum frame size to be transmitted during the transmission interval, the second time, and selectively transmit, subsequent to the first time and prior to the second time, frames of data from the second one of the plurality of queues based on the second time.

In other aspects of the network device, the shaper is configured to determine a size of a next one of the frames of data from the second one of the plurality of queues and selectively transmit the next one of the frames of data based on the size of the next one of the frames of data and the second time. The shaper may be configured to determine a size of a next one of the frames of data from the second one of the plurality of queues, determine an amount of time needed to transmit that next one of the frames of data based on the size, and selectively transmit the next one of the frames of data based on the amount of time and the second time. The shaper may be configured to determine a size of a next one of the frames of data from the second one of the plurality of queues, determine, based on the first time and the second time, a number of bytes that can be transmitted prior to the second time, and selectively transmit the next one of the frames of data based on the number of bytes and the size of the next one of the frames of data.

In other aspects of the network device, the shaper is configured to determine a size of a next one of the frames of data from the second one of the plurality of queues, determine, based on the first time and the second time, a number of clock cycles available prior to the second time, and selectively transmit the next one of the frames of data based on the size of the next one of the frames of data and the number of clock cycles available. The network device further includes a counter configured to store a value corresponding to a remaining time after the first time and prior to the second time. The value of the counter may correspond to a number of bytes that can be transmitted in the remaining time, the value of the counter may correspond to a number of clock cycles available prior to the second time, or the value may correspond to a difference between a first absolute time associated with the first time and a second absolute time associated with the second time.

In other aspects of the network device, the shaper is configured to initialize the value of the counter at the first time. The counter is configured to decrement the value of the counter from the initial value of the counter. The shaper is configured to selectively transmit a next one of the frames of data from the second one of the plurality of queues based on a comparison between a size of the next ones of the frames of data and the value of the counter.

A method of operating a network device includes storing, in a plurality of queues, respective frames of data having a priority level associated with a corresponding one of the plurality of queues, transmitting, during a first portion of a transmission interval, frames of data from a first one of the plurality of queues having a highest priority level, blocking frames of data from a second one of the plurality of queues during a blocking band extending from a first time prior to a start of the transmission interval to a second time indicating the start of the transmission interval, determining, based on the second time and a maximum frame size to be transmitted during the transmission interval, the first time and selectively transmitting, subsequent to the first time and prior to the second time, frames of data from the second one of the plurality of queues based on the second time.

In other aspects, the method further includes determining a size of a next one of the frames of data from the second one of the plurality of queues and selectively transmitting the next one of the frames of data based on the size of the next one of the frames of data and the second time.

In other aspects, the method further includes determining a size of a next one of the frames of data from the second one of the plurality of queues, determining an amount of time needed to transmit that next one of the frames of data based on the size, and selectively transmitting the next one of the frames of data based on the amount of time and the second time.

In other aspects, the method further includes determining a size of a next one of the frames of data from the second one of the plurality of queues, determining, based on the first time and the second time, a number of bytes that can be transmitted prior to the second time; and selectively transmitting the next one of the frames of data based on the number of bytes and the size of the next one of the frames of data.

In other aspects, the method further includes determining a size of a next one of the frames of data from the second one of the plurality of queues, determining, based on the first time and the second time, a number of clock cycles available prior to the second time, and selectively transmitting the next one of the frames of data based on the size of the next one of the frames of data and the number of clock cycles available.

In other aspects, the method further includes storing a value corresponding to a remaining time after the first time and prior to the second time. The value may correspond to a number of bytes that can be transmitted in the remaining time, the value may correspond to a number of clock cycles available prior to the second time, or the value may correspond to a difference between a first absolute time associated with the first time and a second absolute time associated with the second time.

In other aspects, the method further includes initializing the value at the first time, decrementing the value from the initial value, and selectively transmitting a next one of the frames of data from the second one of the plurality of queues based on a comparison between a size of the next ones of the frames of data and the value.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A network device, comprising:
    a plurality of queues, each of the plurality of queues configured to store respective frames of data having a priority level associated with a corresponding one of the plurality of queues; and
    a shaper configured to
        transmit, during a first portion of a transmission interval, frames of data from a first one of the plurality of queues having a highest priority level,
        block frames of data from a second one of the plurality of queues during a blocking band extending from a first time prior to a start of the transmission interval to a second time indicating the start of the transmission interval,
        determine, based on the second time and a maximum frame size to be transmitted during the transmission interval, the first time, and
        selectively transmit, subsequent to the first time and prior to the second time, frames of data from the second one of the plurality of queues based on the second time,
    wherein the shaper is configured to i) determine a size of a next one of the frames of data from the second one of the plurality of queues, ii) determine, based on the first time and the second time, a number of clock cycles available prior to the second time, and iii) selectively transmit the next one of the frames of data based on the size of the next one of the frames of data and the number of clock cycles available.

2. The network device of claim 1 further comprising a counter configured to store a value corresponding to a remaining time after the first time and prior to the second time.

3. The network device of claim 2, wherein the value of the counter corresponds to a number of bytes that can be transmitted in the remaining time.

4. The network device of claim 2, wherein the value of the counter corresponds to the number of clock cycles available prior to the second time.

5. The network device of claim 2, wherein the value of the counter corresponds to a difference between a first absolute time associated with the first time and a second absolute time associated with the second time.

6. The network device of claim 2, wherein the shaper is configured to initialize the value of the counter at the first time.

7. The network device of claim 6, wherein the counter is configured to decrement the value of the counter from the initial value of the counter.

8. The network device of claim 7, wherein the shaper is configured to selectively transmit a next one of the frames of data from the second one of the plurality of queues based on a comparison between (i) a size of the next one of the frames of data and (ii) the value of the counter.

9. A method of operating a network device, the method comprising:
- storing, in a plurality of queues, respective frames of data having a priority level associated with a corresponding one of the plurality of queues;
- transmitting, during a first portion of a transmission interval, frames of data from a first one of the plurality of queues having a highest priority level,
- blocking frames of data from a second one of the plurality of queues during a blocking band extending from a first time prior to a start of the transmission interval to a second time indicating the start of the transmission interval;
- determining, based on the second time and a maximum frame size to be transmitted during the transmission interval, the first time;
- selectively transmitting, subsequent to the first time and prior to the second time, frames of data from the second one of the plurality of queues based on the second time;
- determining a size of a next one of the frames of data from the second one of the plurality of queues;
- determining, based on the first time and the second time, a number of clock cycles available prior to the second time; and
- selectively transmitting the next one of the frames of data based on the size of the next one of the frames of data and the number of clock cycles available.

10. The method of claim 9 further comprising storing a value corresponding to a remaining time after the first time and prior to the second time.

11. The method of claim 10, wherein the value corresponds to (i) a number of bytes that can be transmitted in the remaining time, (ii) the number of clock cycles available prior to the second time, and/or (iii) a difference between a first absolute time associated with the first time and a second absolute time associated with the second time.

12. The method of claim 10, further comprising:
- initializing the value at the first time;
- decrementing the value from the initial value; and
- selectively transmitting a next one of the frames of data from the second one of the plurality of queues based on a comparison between (i) a size of the next one of the frames of data and (ii) the value.

* * * * *